(12) United States Patent
Amosov et al.

(10) Patent No.: US 12,151,965 B2
(45) Date of Patent: Nov. 26, 2024

(54) GLASS MANUFACTURING APPARATUS AND METHODS

(71) Applicant: Corning Incorporated, Corning, NY (US)

(72) Inventors: Alexey Sergeyevich Amosov, Avon (FR); Michael Charles Gerrish, Corning, NY (US); Vladislav Yuryevich Golyatin, Avon (FR); Bulent Kocatulum, Horseheads, NY (US); Steven Howard Tarcza, Painted Post, NY (US); William Anthony Whedon, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 662 days.

(21) Appl. No.: 17/420,591

(22) PCT Filed: Dec. 19, 2019

(86) PCT No.: PCT/US2019/067305
§ 371 (c)(1),
(2) Date: Jul. 2, 2021

(87) PCT Pub. No.: WO2020/146112
PCT Pub. Date: Jul. 16, 2020

(65) Prior Publication Data
US 2022/0081340 A1 Mar. 17, 2022

Related U.S. Application Data

(60) Provisional application No. 62/789,557, filed on Jan. 8, 2019.

(51) Int. Cl.
*C03B 7/07* (2006.01)
*C03B 17/06* (2006.01)

(52) U.S. Cl.
CPC .............. *C03B 7/07* (2013.01); *C03B 17/064* (2013.01)

(58) Field of Classification Search
None
See application file for complete search history.

(56) References Cited

U.S. PATENT DOCUMENTS 2,422,466 A 6/1947 Brown
6,183,829 B1 2/2001 Daecher et al.
(Continued)

FOREIGN PATENT DOCUMENTS

CN 101048351 A 10/2007
CN 102942298 A 2/2013
(Continued)

OTHER PUBLICATIONS

Chinese Patent Application No. 201980091412.1, Office Action dated Nov. 21, 2022, 5 pages (English Translation only), Chinese Patent Office.
(Continued)

*Primary Examiner* — Lisa L Herring
(74) *Attorney, Agent, or Firm* — Kevin M. Able

(57) ABSTRACT

A glass manufacturing apparatus can include a conduit connected to a delivery vessel and an inlet of a forming vessel. The conduit includes a closed sidewall surrounding a channel extending in a flow direction of the conduit. The closed sidewall is continuous from the delivery vessel to the inlet of the forming vessel to define a closed atmosphere from the delivery vessel, through the conduit, and through the inlet of the forming vessel. The glass manufacturing apparatus can include a heating enclosure including a heating wall and a first heating element. The heating wall surrounds a chamber within which the conduit extends. The first heating element is positioned within the chamber
(Continued)

between the heating wall and the conduit to increase a temperature within the channel. Methods for manufacturing a glass ribbon with a glass manufacturing apparatus are provided.

16 Claims, 9 Drawing Sheets

(56) References Cited

U.S. PATENT DOCUMENTS

| | | | |
|---|---|---|---|
| 6,270,863 B1 | 8/2001 | Daecher et al. | |
| 6,997,017 B2 | 2/2006 | Pitbladdo | |
| 7,681,414 B2 | 3/2010 | Pitbladdo | |
| 8,393,177 B2 | 3/2013 | Boratav et al. | |
| 8,720,225 B2 | 5/2014 | Pitbladdo | |
| 9,242,886 B2 | 1/2016 | Bergman et al. | |
| 2006/0016219 A1* | 1/2006 | Pitbladdo | C03B 17/067 65/29.21 |
| 2007/0068197 A1 | 3/2007 | Pitbladdo | |
| 2008/0034798 A1 | 2/2008 | Bergman et al. | |
| 2009/0013725 A1 | 1/2009 | Kano | |
| 2011/0203321 A1* | 8/2011 | De Angelis | C03B 5/167 65/45 |
| 2012/0266633 A1 | 10/2012 | De Angelis et al. | |
| 2014/0144183 A1* | 5/2014 | Demirbas | C03B 5/1675 65/374.13 |
| 2016/0185643 A1* | 6/2016 | Kersting | C03B 17/02 65/195 |
| 2017/0066673 A1 | 3/2017 | Barnett et al. | |
| 2017/0283294 A1 | 10/2017 | Delia et al. | |
| 2018/0370836 A1 | 12/2018 | Aniolek et al. | |
| 2020/0095152 A1 | 3/2020 | Kocatulum et al. | |

FOREIGN PATENT DOCUMENTS

| | | | |
|---|---|---|---|
| CN | 202808576 U | 3/2013 | |
| CN | 108367959 A | 8/2018 | |
| EP | 1832558 A1 | 9/2007 | |
| JP | 2011-168482 A | 9/2011 | |
| JP | 2014-009125 A | 1/2014 | |
| JP | 2017-533878 A | 11/2017 | |
| TW | 1372739 B | 9/2012 | |
| TW | 201726566 A | 8/2017 | |
| TW | 201827362 A | 8/2018 | |
| WO | 2016/053773 A1 | 4/2016 | |
| WO | 2017/184544 A1 | 10/2017 | |
| WO | 2017/192865 A1 | 11/2017 | |
| WO | 2018/052869 A1 | 3/2018 | |
| WO | 2018/111951 A1 | 6/2018 | |
| WO | WO-2018222984 A2 * | 12/2018 | ........... C03B 17/064 |

OTHER PUBLICATIONS

Japanese Patent Application No. 2021-539629, Office Action, dated Nov. 15, 2023, 10 pages (5 pages of English Translation and 5 pages of Original Copy); Japanese Patent Office.

International Search Report and Written Opinion of the International Searching Authority; PCT/US2019/067305; dated Apr. 21, 2020; 10 pages; European Patent Office.

* cited by examiner

GLASS MANUFACTURING APPARATUS AND METHODS

CROSS-REFERENCE TO RELATED APPLICATIONS

This application is a national stage application under 35 U.S.C. § 371 of International Application No. PCT/US2019/067305, filed on Dec. 19, 2019, which claims the benefit of priority of U.S. Provisional Application Ser. No. 62/789,557 filed on Jan. 8, 2019 the contents of which are relied upon and incorporated herein by reference in their entirety as if fully set forth below.

FIELD

The present disclosure relates generally to methods for manufacturing glass and, more particularly, to methods for manufacturing glass with a glass manufacturing apparatus comprising a heating enclosure.

BACKGROUND

It is known to manufacture molten material into a glass ribbon with a glass manufacturing apparatus. Conventional glass manufacturing apparatuses are known to deliver molten material through a heated conduit to a forming vessel. However, the heated conduit may lack adaptability to account for a range of viscosities and temperatures of the molten glass.

SUMMARY

The following presents a simplified summary of the disclosure to provide a basic understanding of some embodiments described in the detailed description.

In accordance with some embodiments, a glass manufacturing apparatus can comprise a conduit connected to a delivery vessel and an inlet of a forming vessel. The conduit can comprise a closed sidewall surrounding a channel extending in a flow direction of the conduit. The closed sidewall can be continuous from the delivery vessel to the inlet of the forming vessel to define a closed atmosphere from the delivery vessel, through the conduit, and through the inlet of the forming vessel. The glass manufacturing apparatus can comprise a heating enclosure comprising a heating wall and a first heating element. The heating wall can surround a chamber within which the conduit extends. The first heating element can be positioned within the chamber between the heating wall and the conduit to increase a temperature within the channel.

In some embodiments, the flow direction is in a direction of gravity.

In some embodiments, the heating wall comprises a thermally insulating material.

In some embodiments, the heating enclosure comprises a perimeter wall surrounding the chamber, the perimeter wall comprising an opening.

In some embodiments, the heating enclosure comprises a first heating apparatus comprising the heating wall and the first heating element, the first heating apparatus removably received within the opening of the perimeter wall.

In some embodiments, the heating enclosure comprises a plurality of heating apparatuses.

In some embodiments, the channel comprises a non-constant cross-sectional size that is orthogonal to the flow direction between the delivery vessel and the inlet of the forming vessel.

In some embodiments, the first heating element is spaced a distance apart from the heating wall and the conduit.

In some embodiments, the glass manufacturing apparatus comprises one or more temperature sensors positioned within the chamber.

In accordance with some embodiments, a glass manufacturing apparatus can comprise a conduit positioned between a delivery vessel and an inlet of a forming vessel. The conduit can comprise a channel extending in a flow direction of the conduit. The conduit can comprise a first portion, in which the channel comprises a first cross-sectional size, and a second portion, downstream from the first portion relative to the flow direction, in which the channel comprises a second cross-sectional size that is less than the first cross-sectional size. The glass manufacturing apparatus can comprise a heating enclosure comprising a heating wall and a first heating element. The heating wall surrounds a chamber within which the second portion of the conduit extends. The first heating element is positioned within the chamber between the heating wall and the second portion of the conduit to increase a temperature within the channel.

In some embodiments, the flow direction is in a direction of gravity.

In some embodiments, the heating wall comprises a thermally insulating material.

In some embodiments, the heating enclosure comprises a perimeter wall surrounding the chamber, the perimeter wall comprising an opening.

In some embodiments, the heating wall and the first heating element comprise a first heating apparatus, the first heating apparatus removably received within the opening of the perimeter wall.

In some embodiments, the glass manufacturing apparatus comprises one or more temperature sensors positioned within the chamber.

In accordance with some embodiments, methods of manufacturing a glass ribbon with a glass manufacturing apparatus can comprise flowing molten material within a channel of a conduit in a flow direction of the conduit. Methods can further comprise heating the molten material flowing within the channel with a heating enclosure that surrounds the conduit. Methods can further comprise removing a portion of the heating enclosure to cool the molten material flowing within the channel.

In some embodiments, the flowing the molten material comprises flowing the molten material in a direction of gravity.

In some embodiments, the heating the molten material with the heating enclosure comprises maintaining a first heating element of the heating enclosure at a different temperature than a second heating element of the heating enclosure.

In some embodiments, the removing the portion of the heating enclosure comprises removing one or more of the first heating element or the second heating element from the heating enclosure.

In some embodiments, methods can further comprise heating the molten material flowing within the channel with a first heater that is upstream from the heating enclosure relative to the flow direction and with a second heater that is downstream from the heating enclosure relative to the flow direction.

BRIEF DESCRIPTION OF THE DRAWINGS

These and other features, embodiments and advantages are better understood when the following detailed description is read with reference to the accompanying drawings, in which.

DETAILED DESCRIPTION

Figure 1:
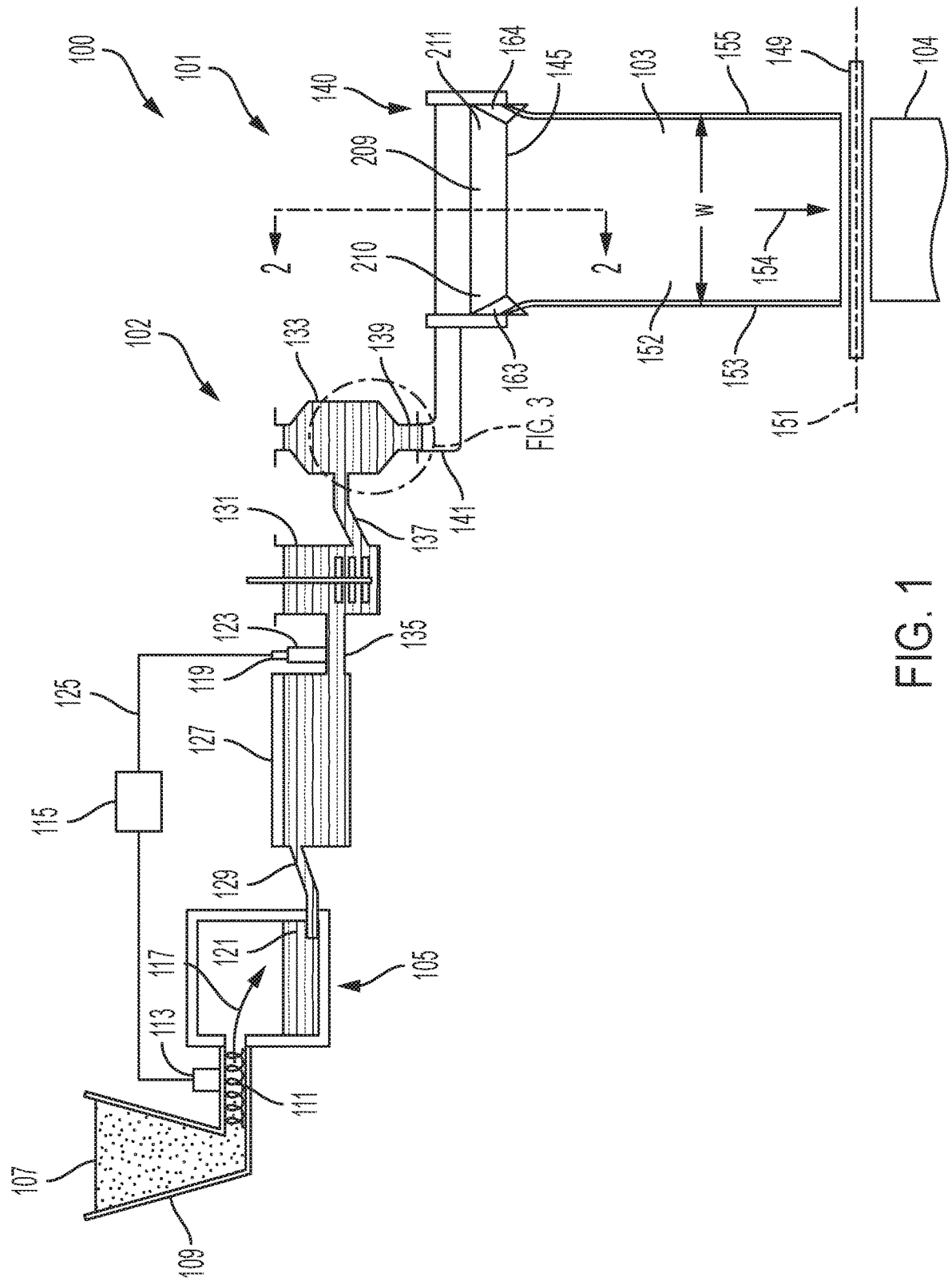
FIG. 1 schematically illustrates a glass manufacturing apparatus in accordance with embodiments of the disclosure.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

The present disclosure relates to a glass manufacturing apparatus and methods for manufacturing a glass article (e.g., a glass ribbon) from a quantity of molten material. A slot draw apparatus, float bath apparatus, down-draw apparatus, up-draw apparatus, press-rolling apparatus or other glass manufacturing apparatus can be used to form a glass ribbon from a quantity of molten material.

Methods and apparatus for manufacturing glass will now be described by way of example embodiments for forming a glass ribbon from a quantity of molten material. As schematically illustrated in FIG. 1, in some embodiments, an example glass manufacturing apparatus 100 can comprise a glass melting and delivery apparatus 102 and a forming apparatus 101 comprising a forming vessel 140 designed to produce a glass ribbon 103 from a quantity of molten material 121. In some embodiments, the glass ribbon 103 can comprise a central portion 152 positioned between opposite, thick edge portions (e.g., "beads") formed along a first outer edge 153 and a second outer edge 155 of the glass ribbon 103. Additionally, in some embodiments, a separated glass ribbon 104 can be separated from the glass ribbon 103 along a separation path 151 by a glass separator 149 (e.g., scribe, score wheel, diamond tip, laser, etc.). In some embodiments, before or after separation of the separated glass ribbon 104 from the glass ribbon 103, the thick edge beads formed along the first outer edge 153 and the second outer edge 155 can be removed to provide the central portion 152 as a high-quality separated glass ribbon 104 with a uniform thickness.

In some embodiments, the glass melting and delivery apparatus 102 can comprise a melting vessel 105 oriented to receive batch material 107 from a storage bin 109. The batch material 107 can be introduced by a batch delivery device 111 powered by a motor 113. In some embodiments, an optional controller 115 can be operated to activate the motor 113 to introduce a desired amount of batch material 107 into the melting vessel 105, as indicated by arrow 117. The melting vessel 105 can heat the batch material 107 to provide molten material 121. In some embodiments, a melt probe 119 can be employed to measure a level of molten material 121 within a standpipe 123 and communicate the measured information to the controller 115 by way of a communication line 125.

Additionally, in some embodiments, the glass melting and delivery apparatus 102 can comprise a first conditioning station comprising a fining vessel 127 located downstream from the melting vessel 105 and coupled to the melting vessel 105 by way of a first connecting conduit 129. In some embodiments, molten material 121 can be gravity fed from the melting vessel 105 to the fining vessel 127 by way of the first connecting conduit 129. For example, in some embodiments, gravity can drive the molten material 121 through an interior pathway of the first connecting conduit 129 from the melting vessel 105 to the fining vessel 127. Additionally, in some embodiments, bubbles can be removed from the molten material 121 within the fining vessel 127 by various techniques.

In some embodiments, the glass melting and delivery apparatus 102 can further comprise a second conditioning station comprising a mixing chamber 131 that can be located downstream from the fining vessel 127. The mixing chamber 131 can be employed to provide a homogenous composition of molten material 121, thereby reducing or eliminating inhomogeneity that may otherwise exist within the molten material 121 exiting the fining vessel 127. As shown, the fining vessel 127 can be coupled to the mixing chamber 131 by way of a second connecting conduit 135. In some embodiments, molten material 121 can be gravity fed from the fining vessel 127 to the mixing chamber 131 by way of the second connecting conduit 135. For example, in some embodiments, gravity can drive the molten material 121 through an interior pathway of the second connecting conduit 135 from the fining vessel 127 to the mixing chamber 131.

Additionally, in some embodiments, the glass melting and delivery apparatus 102 can comprise a third conditioning station comprising a delivery vessel 133 that can be located downstream from the mixing chamber 131. In some embodiments, the delivery vessel 133 can condition the molten material 121 to be fed into an inlet conduit 141. For example, the delivery vessel 133 can function as an accumulator and/or flow controller to adjust and provide a consistent flow of molten material 121 to the inlet conduit 141. As shown, the mixing chamber 131 can be coupled to the delivery vessel 133 by way of a third connecting conduit 137. In some embodiments, molten material 121 can be gravity fed from the mixing chamber 131 to the delivery vessel 133 by way of the third connecting conduit 137. For example, in some embodiments, gravity can drive the molten material 121 through an interior pathway of the third connecting conduit 137 from the mixing chamber 131 to the delivery vessel 133. As further illustrated, in some embodiments, a conduit 139 can be positioned to deliver molten material 121 to forming apparatus 101, for example the inlet conduit 141 of the forming vessel 140.

Forming apparatus 101 can comprise various embodiments of forming vessels in accordance with features of the disclosure comprising a forming vessel with a wedge for fusion drawing the glass ribbon, a forming vessel with a slot to slot draw the glass ribbon, or a forming vessel provided with press rolls to press roll the glass ribbon from the forming vessel. By way of illustration, the forming vessel 140 shown and disclosed below can be provided to fusion draw molten material 121 off a bottom edge, defined as a root 145, of a forming wedge 209 to produce a ribbon of molten material 121 that can be drawn and cooled into the glass ribbon 103. For example, in some embodiments, the molten material 121 can be delivered from the inlet conduit 141 to the forming vessel 140. The molten material 121 can then be formed into the glass ribbon 103 based, in part, on the structure of the forming vessel 140. For example, as shown, the molten material 121 can be drawn as a ribbon of molten material off the bottom edge (e.g., root 145) of the forming vessel 140 along a draw path extending in a draw direction 154 of the glass manufacturing apparatus 100. In some embodiments, edge directors 163, 164 can direct the ribbon of molten material off the forming vessel 140 and define, in part, a width "W" of the glass ribbon 103. In some embodiments, the width "W" of the glass ribbon 103 can extend between the first outer edge 153 of the glass ribbon 103 and the second outer edge 155 of the glass ribbon 103.

In some embodiments, the width "W" of the glass ribbon 103, which is the dimension between the first outer edge 153 of the glass ribbon 103 and the second outer edge 155 of the glass ribbon 103 in a direction that is orthogonal to the draw direction 154, can be greater than or equal to about 20 mm, such as greater than or equal to about 50 mm, such as greater than or equal to about 100 mm, such as greater than or equal to about 500 mm, such as greater than or equal to about 1000 mm, such as greater than or equal to about 2000 mm, such as greater than or equal to about 3000 mm, such as greater than or equal to about 4000 mm, although other widths less than or greater than the widths mentioned above can be provided in further embodiments. For example, in some embodiments, the width "W" of the glass ribbon 103 can be from about 20 mm to about 4000 mm, such as from about 50 mm to about 4000 mm, such as from about 100 mm to about 4000 mm, such as from about 500 mm to about 4000 mm, such as from about 1000 mm to about 4000 mm, such as from about 2000 mm to about 4000 mm, such as from about 3000 mm to about 4000 mm, such as from about 20 mm to about 3000 mm, such as from about 50 mm to about 3000 mm, such as from about 100 mm to about 3000 mm, such as from about 500 mm to about 3000 mm, such as from about 1000 mm to about 3000 mm, such as from about 2000 mm to about 3000 mm, such as from about 2000 mm to about 2500 mm, and all ranges and subranges therebetween.

Figure 2:
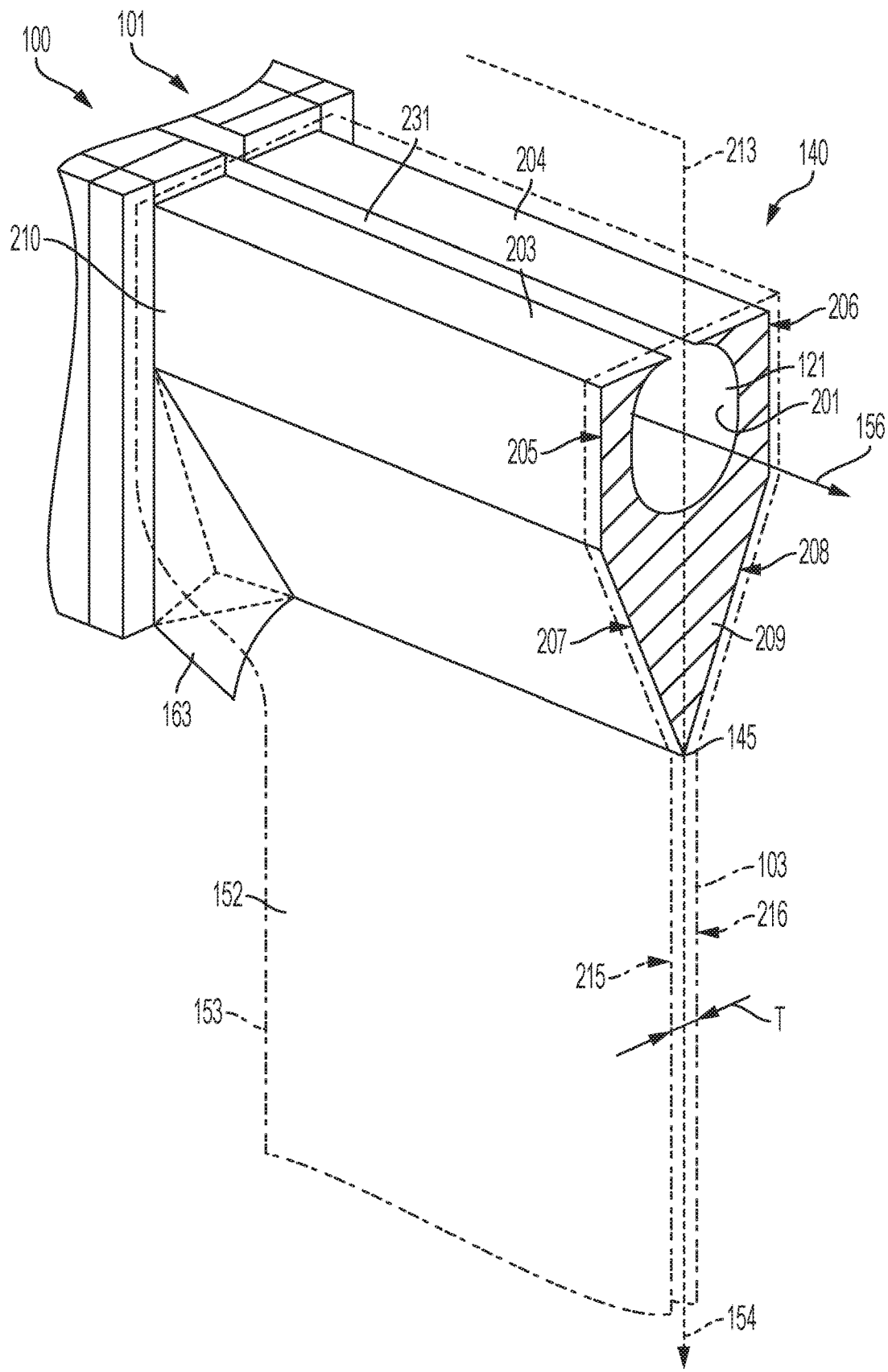
FIG. 2 shows a perspective cross-sectional view of the glass manufacturing apparatus along line 2-2 of FIG. 1 in accordance with embodiments of the disclosure.

FIG. 2 shows a cross-sectional perspective view of the forming apparatus 101 (e.g., forming vessel 140) along line 2-2 of FIG. 1. In some embodiments, the forming vessel 140 can comprise a trough 201 oriented to receive the molten material 121 from the inlet conduit 141. For illustrative purposes, cross-hatching of the molten material 121 is removed from FIG. 2 for clarity. The forming vessel 140 can further comprise the forming wedge 209 comprising a pair of downwardly inclined converging surface portions 207, 208 extending between opposed ends 210, 211 (See FIG. 1) of the forming wedge 209. The pair of downwardly inclined converging surface portions 207, 208 of the forming wedge 209 can converge along the draw direction 154 to intersect along the root 145 of the forming vessel 140. A draw plane 213 of the glass manufacturing apparatus 100 can extend through the root 145 along the draw direction 154. In some embodiments, the glass ribbon 103 can be drawn in the draw direction 154 along the draw plane 213. As shown, the draw plane 213 can bisect the forming wedge 209 through the root 145 although, in some embodiments, the draw plane 213 can extend at other orientations relative to the root 145.

Additionally, in some embodiments, the molten material 121 can flow in a direction 156 into and along the trough 201 of the forming vessel 140. The molten material 121 can then overflow from the trough 201 by simultaneously flowing over corresponding weirs 203, 204 and downward over the outer surfaces 205, 206 of the corresponding weirs 203, 204. Respective streams of molten material 121 can then flow along the downwardly inclined converging surface portions 207, 208 of the forming wedge 209 to be drawn off the root 145 of the forming vessel 140, where the flows converge and fuse into the ribbon of molten material. The ribbon of molten material can then be drawn off the root 145 in the draw plane 213 along the draw direction 154 and cooled into the glass ribbon 103.

In some embodiments, the forming vessel 140 can comprise a slot 231 through which the molten material 121 can overflow from the trough 201 by flowing over corresponding weirs 203, 204. For example, the trough 201 can comprise a non-constant width orthogonal to the draw plane 213 along a direction that is opposite the draw direction 154. Walls defining the trough 201 can converge in the direction that is opposite the draw direction 154 towards a top of the forming vessel 140, whereupon the slot 231 can be defined between the walls at a top of the forming vessel 140. In some embodiments, a width of the slot 231 (e.g., as measured in a direction that is orthogonal to the draw plane 213) may be less than a width of the trough 201 at a central location of the trough 201 (e.g., between a top and bottom of the trough 201). In some embodiments, the slot 231 may comprise a constant width along the direction 156 (e.g., along a length of the forming vessel 140). In other embodiments, however, the slot 231 may comprise a non-constant width along the direction 156. For example, ends of the slot 231 may comprise a larger width than a central region of the slot 231, or the slot 231 can comprise an increasing or decreasing width along the direction 156 from one end of the forming vessel 140 to another end of the forming vessel 140. As will be described herein, by providing the forming vessel 140 with the slot 231, pressure can build up as the molten material 121 flows through the conduit 139. This pressure build-up can equalize flow of the molten material 121 through the forming vessel 140 and ensure a more consistent distribution of the molten material 121 that flows through the slot 231. It will be appreciated, however, that in some embodiments, the forming vessel 140 is not limited to comprising the slot 231, but, rather, an opening at the top of the forming vessel 140 may be larger.

The glass ribbon 103 comprises a first major surface 215 and a second major surface 216 facing opposite directions and defining a thickness "T" (e.g., average thickness) of the glass ribbon 103. In some embodiments, the thickness "T" (e.g., average thickness) of the glass ribbon 103 can be less than or equal to about 2 millimeters (mm), less than or equal to about 1 millimeter, less than or equal to about 0.5 millimeters, for example, less than or equal to about 300 micrometers (μall), less than or equal to about 200 micrometers, or less than or equal to about 100 micrometers, although other thicknesses may be provided in further embodiments. For example, in some embodiments, the thickness "T" of the glass ribbon 103 can be from about 50 μm to about 750 μm, from about 100 μm to about 700 μm, from about 200 μm to about 600 μm, from about 300 μm to about 500 μm, from about 50 μm to about 500 μm, from about 50 μm to about 700 μm, from about 50 μm to about 600 μm, from about 50 μm to about 500 μm, from about 50 μm to about 400 μm, from about 50 μm to about 300 μm, from about 50 μm to about 200 μm, from about 50 μm to about 100 μm, comprising all ranges and subranges of thicknesses therebetween. In addition, the glass ribbon 103 can comprise a variety of compositions comprising, but not limited to, soda-lime glass, borosilicate glass, aluminoborosilicate glass, alkali-containing glass, or alkali-free glass.

In some embodiments, the glass separator 149 (see FIG. 1) can then separate a separated glass ribbon 104 from the glass ribbon 103 along the separation path 151 as the glass ribbon 103 is formed by the forming vessel 140. As illustrated, in some embodiments, the separation path 151 can extend along the width "W" of the glass ribbon 103 between the first outer edge 153 and the second outer edge 155, such as by being orthogonal to the draw direction 154. Moreover, in some embodiments, the draw direction 154 can define a direction along which the glass ribbon 103 can be drawn from the forming vessel 140.

In some embodiments, a plurality of separated glass ribbons 104 can be stacked to form a stack of separated glass ribbons 104. In some embodiments, interleaf material can be placed between an adjacent pair of separated glass ribbons 104 to help prevent contact and therefore preserve the pristine surfaces of the pair of separated glass ribbons 104.

In further embodiments, although not shown, glass ribbon 103 from the glass manufacturing apparatus may be coiled onto a storage roll. Once a desired length of coiled glass ribbon is stored on the storage roll, the glass ribbon 103 may be separated by the glass separator 149 such that the separated glass ribbon is stored on the storage roll. In further embodiments, a separated glass ribbon can be separated into another separated glass ribbon. For example, a separated glass ribbon 104 (e.g., from the stack of glass ribbons) can be further separated into another separated glass ribbon. In further embodiments, a separated glass ribbon stored on a storage roll can be uncoiled and further separated into another separated glass ribbon.

The separated glass ribbon can then be processed into a desired application, e.g., a display application. For example, the separated glass ribbon can be used in a wide range of display applications, comprising liquid crystal displays (LCDs), electrophoretic displays (EPD), organic light emitting diode displays (OLEDs), plasma display panels (PDPs), and other electronic displays.

Figure 3:
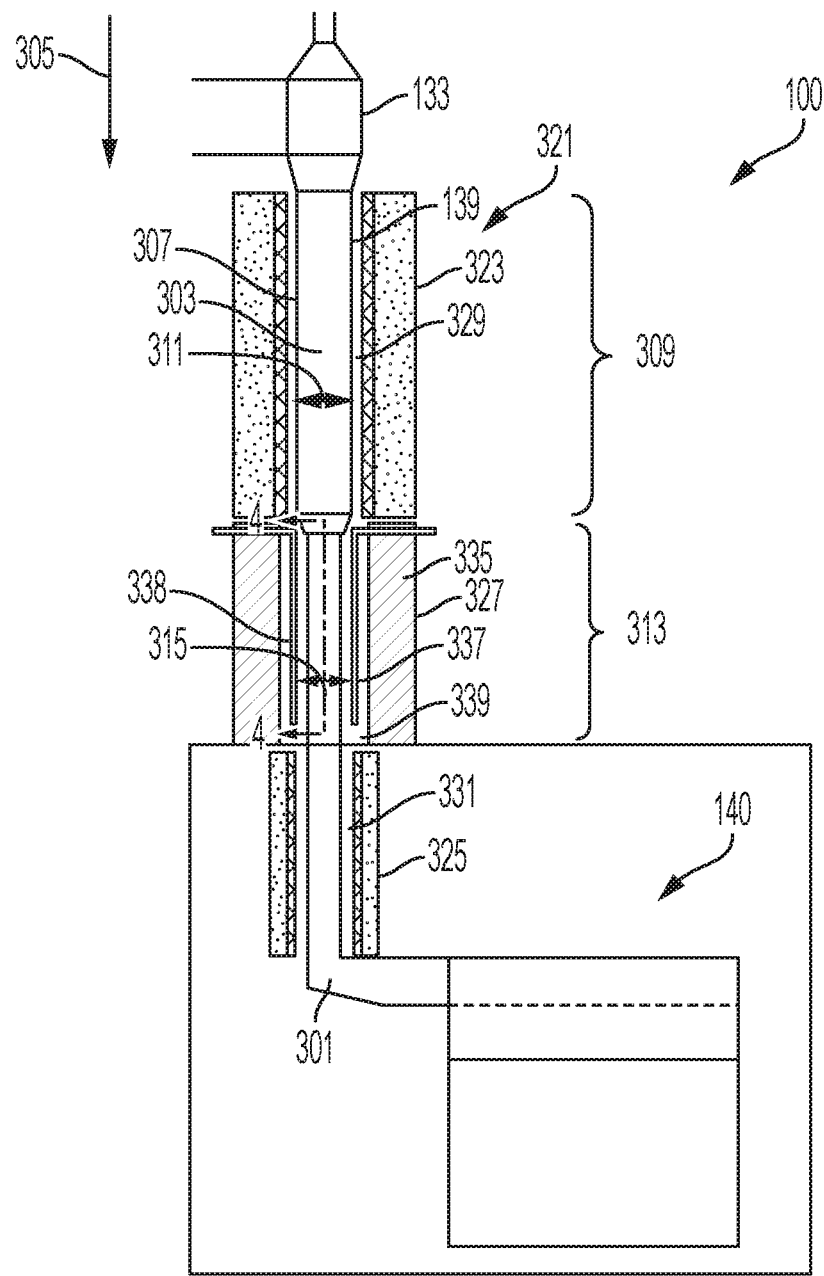
FIG. 3 illustrates an enlarged view of a portion of the glass manufacturing apparatus taken at view 3 of FIG. 1 in accordance with embodiments of the disclosure.

FIG. 3 illustrates an enlarged view of a portion of the glass manufacturing apparatus 100 taken at view 3 of FIG. 1, according to some embodiments. In some embodiments, the glass manufacturing apparatus 100 comprises the conduit 139 positioned between the delivery vessel 133 and an inlet 301 of the forming vessel 140, wherein the conduit 139 can deliver the molten material 121 from the delivery vessel 133 to the forming vessel 140. For example, the conduit 139 is hollow and comprises a channel 303 that extends in a flow direction 305 of the conduit 139. The molten material 121 can flow through the channel 303 along the flow direction 305 towards the inlet 301 of the forming vessel 140. In some embodiments, the conduit 139 can extend substantially vertically between the delivery vessel 133 and the inlet 301 of the forming vessel 140, such that the flow direction 305 may be in a direction of gravity. For example, the conduit 139 can extend along an axis, wherein the axis is in a direction of gravity.

In some embodiments, the conduit 139 can comprise a closed sidewall 307 that surrounds the channel 303 extending in the flow direction 305 of the conduit 139. The closed sidewall 307 can be free of openings (e.g., voids, gaps, spaces, etc.) between the delivery vessel 133 and the inlet 301 of the forming vessel 140. For example, by being closed and free of openings, the closed sidewall 307 may not define a free path between an interior of the conduit and an exterior of the conduit 139. In this way, the closed sidewall 307 may surround the channel 303 while limiting air or unwanted contaminants from passing through the closed sidewall 307 and entering the channel 303. As a result of the molten material 121 not being exposed to air or contaminants through the closed sidewall 307, unwanted effects such as the formation of condensation within the channel 303, the permeation of hydrogen within the molten material 121, and/or the inclusion of contaminants within the molten material 121 may be reduced. The closed sidewall 307 may comprise, for example, a metal material (e.g., platinum).

In some embodiments, the conduit 139 can be connected to the delivery vessel 133 and the inlet 301 of the forming vessel 140. By being connected to the delivery vessel 133 and the inlet 301 of the forming vessel 140, the closed sidewall 307 can be continuous from the delivery vessel 133 to the inlet 301 of the forming vessel 140 to define a closed atmosphere from the delivery vessel 133, through the conduit 139, and through the inlet 301 of the forming vessel 140. For example, the conduit 139 can be connected to the delivery vessel 133, such as by the closed sidewall 307 being connected to an outlet of the delivery vessel 133. In this way, the outlet of the delivery vessel 133 and the conduit 139 that is connected to the outlet of the delivery vessel 133 may be free of openings (e.g., voids, gaps, spaces, etc.) between an interior (e.g., of the outlet of the delivery vessel 133 and the conduit 139 that is connected to the outlet of the delivery vessel 133) where the molten material 121 flows through and an exterior. Likewise, the conduit 139 can be connected to the inlet 301 of the forming vessel 140, such as by the closed sidewall 307 being connected to the inlet 301 of the forming vessel 140. For example, one or more walls may define the inlet 301 of the forming vessel 140, with these walls being connected to the conduit 139. In this way, the inlet 301 of the forming vessel 140 and the conduit 139 that is connected to the inlet 301 of the forming vessel 140 may be free of openings (e.g., voids, gaps, spaces, etc.) between an interior where the molten material 121 flows (e.g., of the inlet 301 of the forming vessel 140 and the conduit 139 that is connected to the inlet 301 of the forming vessel 140) and an exterior. Accordingly, as the molten material 121 flows from the delivery vessel 133, through the conduit 139, and through the inlet 301 to the forming vessel 140, the molten material 121 may be contained within a closed atmosphere that is not exposed to an exterior via openings.

By providing the conduit 139 with the closed sidewall 307 and in connection with the delivery vessel 133 and the inlet 301 of the forming vessel 140, access to the molten material 121 that flows from the delivery vessel, through the conduit 139, and into the inlet 301 of the forming vessel 140 from an exterior is limited. In this way, air or unwanted contaminants are halted from contacting or contaminating the molten material 121. In addition, pressure within the conduit 139 can be built up as the molten material 121 flows within the conduit 139. This pressure can force the molten material 121 to flow into the forming vessel 140 and exit the forming vessel 140 through the slot 231 (e.g., illustrated in FIG. 2). Due to the geometry of the forming vessel and the reduced width of the slot 231, the pressure generated within the conduit 139 can facilitate a more even flow of molten material 121 through the slot 231 along a length of the forming vessel 140. For example, a distribution of the molten material 121 exiting the slot 231 can be more uniform due to a combination of the slot 231 (e.g., the reduced width of the slot) and the conduit 139 comprising the closed sidewall 307 that is connected to and continuous with the delivery vessel 133 and the inlet 301 of the forming vessel 140. By removing any openings, voids, etc. in the conduit 139, pressure may be maintained within the conduit 139 (e.g., wherein if an opening were present, pressure in the conduit 139 may decrease).

In some embodiments, the channel 303 can comprise a non-constant cross-sectional size that is orthogonal to the flow direction 305 between the delivery vessel 133 and the inlet 301 of the forming vessel 140. For example, the cross-sectional size of the channel 303 may be measured in a direction that is orthogonal to an axis along which the conduit 139 extends. In some embodiments, the conduit 139 may comprise a circular shape, in which case the cross-sectional size of the channel 303 can comprise a diameter that is non-constant between the delivery vessel 133 and the inlet 301 of the forming vessel 140. In some embodiments, the conduit 139 comprises a first portion 309, in which the channel 303 comprises a first cross-sectional size 311, and a second portion 313, downstream from the first portion 309 relative to the flow direction 305, in which the channel 303 comprises a second cross-sectional size 315 (e.g., diameter) that is less than the first cross-sectional size 311. The reduction in cross-sectional size of the channel 303 can assist in concentrating a flow resistance of the molten material 121 at the second portion 313 of the conduit 139. For example, the glass manufacturing apparatus 100 can provide for increased heating of the molten material 121 (e.g., via heating enclosure 327) as the molten material 121 flows through the conduit 139. The increased heat that is provided to the molten material 121 can increase a flow rate of the molten material 121 through the conduit 139, such as due to a lower viscosity of the molten material 121. To compensate for the increased flow rate of the molten material 121, the conduit 139 can have a reduced cross-sectional size at the second portion 313, which can reduce the flow rate of the molten material 121, thus compensating for the lowered viscosity. In some embodiments, the first cross-sectional size 311 may be from about 26 centimeters (cm) to about 34 cm. In some embodiments, the second cross-sectional size 315 may be from about 17 cm to about 23 cm. In some embodiments, the second cross-sectional size 315 may be from about 25% to about 75% the size of the first cross-sectional size 311.

The glass manufacturing apparatus 100 can comprise one or more heating apparatuses 321 that can heat the molten material 121 within the channel 303. For example, the one or more heating apparatuses 321 of the glass manufacturing apparatus 100 can comprise a first heater 323, a second heater 325, and a heating enclosure 327. The first heater 323 can define a first heated passageway 329 through which the conduit 139 can extend. In some embodiments, the first portion 309 of the conduit 139 can extend through the first heated passageway 329, such that the first heater 323 can heat the molten material 121 that flows through the first portion 309 of the conduit 139. The first heater 323 can be positioned upstream from the heating enclosure 327 relative to the flow direction 305. The second heater 325 can define a second heated passageway 331 through which the conduit 139 can extend. In some embodiments, the second portion 313 of the conduit 139 can extend through the second heated passageway 331, such that the second heater 325 can heat the molten material 121 that flows through the second portion 313 of the conduit 139. In some embodiments, the second heater 325 can be positioned downstream from the heating enclosure 327 relative to the flow direction 305.

The heating enclosure 327 can be positioned downstream from the first heater 323. In further embodiments including the second heater 325, as shown, the heating enclosure 327 can be positioned between the first heater 323 and the second heater 325. As shown, the heating enclosure 327 can surround a portion of the conduit 139. In some embodiments, the heating enclosure 327 can comprise a heating wall 335 and a first heating element 337. The first heating element 337 may comprise, for example, a resistive heating element 337, in which electric current flow through the first heating element 337 can generate heat. The heating wall 335 can surround a chamber 339 within which the conduit 139 extends. For example, in some embodiments, the second portion 313 of the conduit 139 can extend through the chamber 339, such that the second portion 313 of the conduit 139 can be received within the heating enclosure 327 and the second heater 325. The first heating element 337 can be positioned within the chamber 339 between the heating wall 335 and the conduit 139, and can increase the temperature within the chamber 339 and, thus, the channel 303. For example, when the first heating element 337 is turned on, the first heating element 337 can generate heat, which may increase a temperature within the chamber 339. The temperature increase within the chamber 339 can likewise increase a temperature of the molten material 121 that flows within the channel 303. In some embodiments, the first heating element 337 can extend substantially parallel to an axis along which the conduit 139 extends, with the first heating element being spaced a distance apart from the heating wall 335 and the conduit 139. The heating enclosure 327 is not limited to comprising a single heating element (e.g., the first heating element 337), and, in some embodiments, the heating enclosure 327 may comprise a plurality of heating elements, for example, a second heating element 338, a third heating element 340, etc.

In some embodiments, the heating elements 337, 338, 340 can comprise molybdenum disilicide heating elements, while the first heater 323 and the second heater 325 can comprise platinum heating elements. In some embodiments, the heating elements 337, 338, 340 can produce a higher power output than the platinum heating elements of the first heater 323 and the second heater 325. For example, in some embodiments, the platinum heating elements of the first heater 323 and the second heater 325 can each produce a power output of from about 300 watts to about 400 watts. In some embodiments, the heating elements 337, 338, 340, which may comprise molybdenum disilicide heating elements, can each produce a power output of from about 1000 kilowatts to about 2000 kilowatts. As such, when the heating enclosure 327 comprises four heating elements, the heating enclosure 327 can produce a power output of from about 4000 kilowatts to about 8000 kilowatts. As such, due to the power density of the heating elements 337, 338, 340 of the heating enclosure 327, increased temperature output can be achieved while accommodating for a relatively small space between the first heater 323 and the second heater 325.

Figure 4:
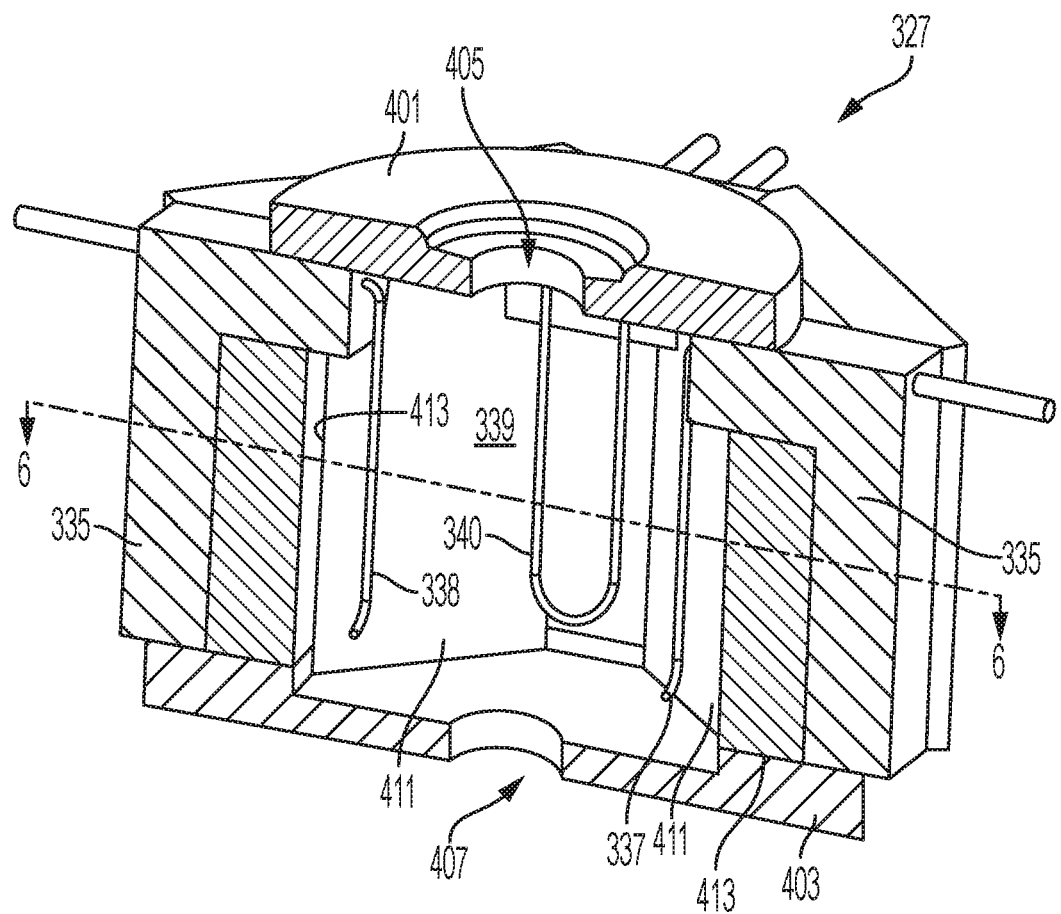
FIG. 4 illustrates a cross-sectional view of a heating enclosure along line 4-4 of FIG. 3 in accordance with embodiments of the disclosure.

Referring to FIG. 4, a cross-sectional view of the heating enclosure 327 along line 4-4 of FIG. 3 is illustrated. To more clearly illustrate portions of the heating enclosure 327, the conduit 139 is omitted from FIG. 4. It will be appreciated, however, that the conduit 139 can be positioned to pass through the heating enclosure 327 in a similar manner as illustrated in FIG. 3. In some embodiments, the heating enclosure 327 comprises a top wall 401 and a bottom wall 403. The top wall 401 can be positioned adjacent to a bottom surface of the first heater 323, while the bottom wall 403 can be positioned adjacent to a top surface of the second heater 325. In some embodiments, the top wall 401 can define a top wall opening 405 through which the conduit 139 can be received. The top wall 401 can be spaced apart from the bottom wall 403 to define the chamber 339 therebetween. In some embodiments, the bottom wall 403 can define a bottom wall opening 407 within which the conduit 139 can be received. As such, the second portion 313 of the conduit 139 can extend through the top wall opening 405, the chamber 339, and the bottom wall opening 407.

The heating enclosure 327 can comprise a perimeter wall 411 surrounding the chamber 339. In some embodiments, the perimeter wall 411 can extend between the top wall 401 and the bottom wall 403, and around the conduit 139 to define the chamber 339. For example, when the conduit 139 is received within the chamber 339, the perimeter wall 411 can extend coaxially with the conduit 139. The perimeter wall 411 can be spaced a distance apart from the conduit 139 such that the chamber 339 exists between the perimeter wall 411 and the conduit 139. In some embodiments, the perimeter wall 411 can comprise an opening 413 (e.g., the opening 413 also illustrated in FIGS. 6-7). The opening 413 is illustrated in FIG. 7 without any structures or components (e.g., first heating apparatus 501) positioned within the opening 413, while the opening 413 in FIGS. 4 and 6 have a structure (e.g., first heating apparatus 501) positioned within the opening 413. In some embodiments, the opening 413 can be defined between the perimeter wall 411, the top wall 401, and the bottom wall 403. In some embodiments, a portion of the first heating element 337 can be received within the opening 413 of the perimeter wall 411.

Figure 5:
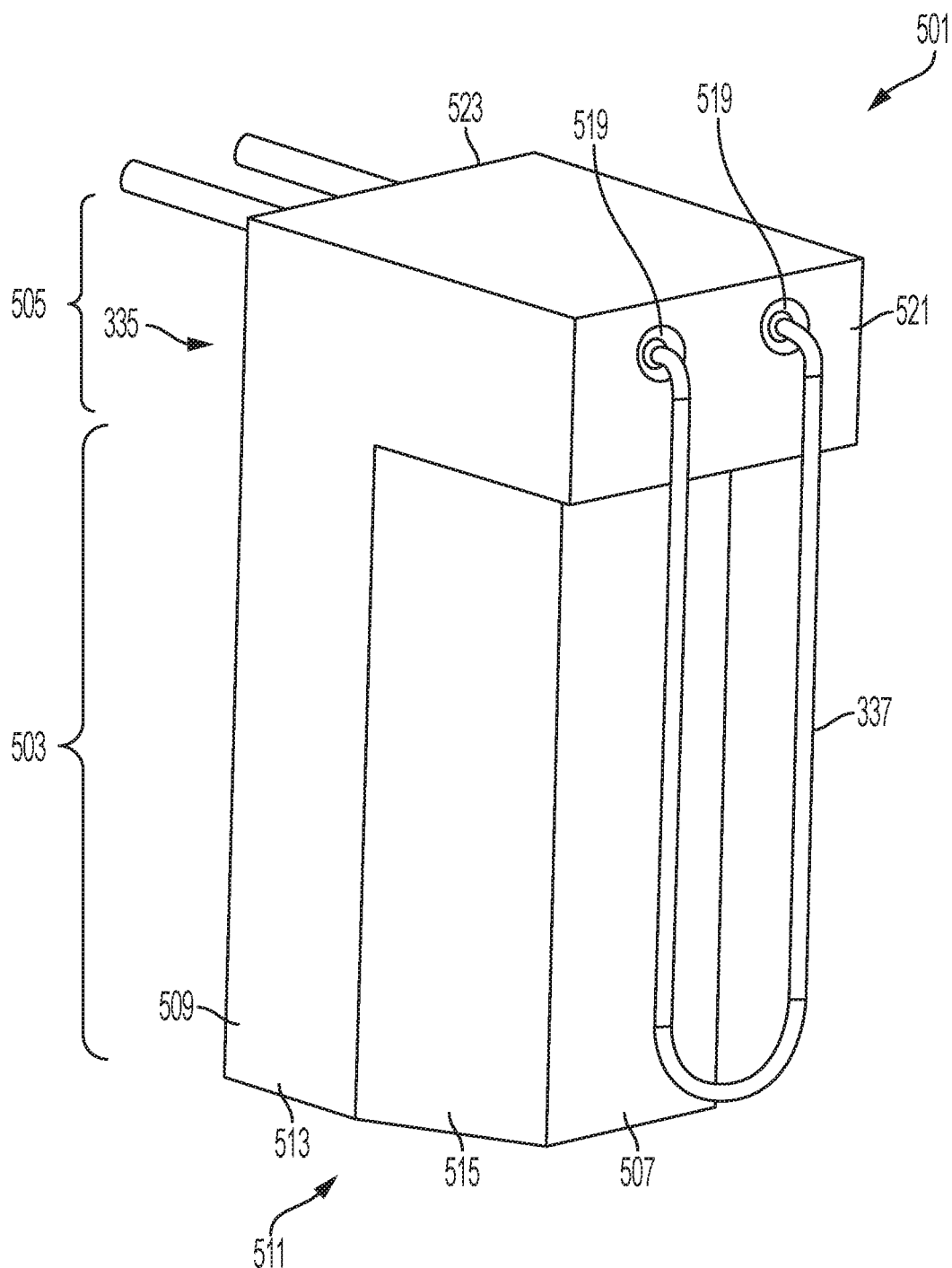
FIG. 5 illustrates a perspective view of a heating apparatus of the heating enclosure in accordance with embodiments of the disclosure.

Referring to FIG. 5, the heating enclosure 327 may comprise a first heating apparatus 501 that comprises the heating wall 335 and the first heating element 337. In some embodiments, the heating wall 335 comprises a thermally insulating material, for example, a ceramic material. The heating wall 335 can comprise a first wall portion 503 and a second wall portion 505. In some embodiments, the first wall portion 503 can form a lower part of the heating wall 335 while the second wall portion 505 can form an upper part of the heating wall 335. The first wall portion 503 may comprise a front face 507, a rear face 509, and one or more side faces 511. In some embodiments, when the heating enclosure 327 surrounds the conduit 139, the front face 507 is positioned facing the conduit 139 and the chamber 339. The rear face 509 can face away from the conduit 139 and the chamber 339 (e.g., in an opposite direction of the front face 507), with the rear face 509 bordering an exterior of the heating enclosure 327. In some embodiments, the front face 507 extends substantially parallel to the rear face 509. The one or more side faces 511 of the first wall portion 503 can extend between the front face 507 and the rear face 509. A first side face 513 can extend substantially orthogonal to the rear face 509 and can be positioned adjacent to the rear face 509. A second side face 515 can extend between the first side face 513 and the front face 507. In some embodiments, the second side face 515 may be angled relative to the first side face 513 and the front face 507. For example, the second side face 515 may be non-orthogonal to the first side face 513 and non-orthogonal to the front face 507. The first heating apparatus 501 may comprise an additional first side face 513 and second side face 515 (e.g., that are obstructed from view in FIG. 5) opposite the illustrated first side face 513 and the second side face 515.

The second wall portion 505 can be attached to or formed with the first wall portion 503. For example, in some embodiments, the first wall portion 503 and the second wall portion 505 can comprise a monolithic block. In some embodiments, the second wall portion 505 can define one or more heater openings 519 that extend through the second wall portion 505 between a front face 521 and a rear face 523. In some embodiments, the first heating element 337 can be received through the heater openings 519, such that a portion of the first heating element 337 can be positioned within the chamber 339 while being controlled from an exterior of the chamber 339. The rear face 523 of the second wall portion 505 can be substantially co-planar with the rear face 509 of the first wall portion 503. In some embodiments, the front face 521 of the second wall portion 505 may extend parallel to the front face 507 of the first wall portion 503, while being non-co-planar relative to the front face 507. For example, the second wall portion 505 can extend a distance beyond the front face 507 of the first wall portion 503, such that the front face 521 of the second wall portion 505 may be in closer proximity to the conduit 139 than the front face 507 of the first wall portion 503. In some embodiments, a distance between the front face 521 and the rear face 523 of the second wall portion 505 in a direction that is orthogonal to the front face 521 and the rear face 523 may be greater than a distance between the front face 507 and the rear face 509 of the first wall portion 503 in a direction that is orthogonal to the front face 507 and the rear face 509. As such, in some embodiments, due to the second wall portion 505 protruding beyond the first wall portion 503 towards the conduit 139, the first heating element 337 can be spaced a distance apart from the front face 507 of the first wall portion 503.

The first heating element 337 can comprise a U-shaped portion that may be positioned within the chamber 339 of the heating enclosure 327. In some embodiments, the heating enclosure 327 may comprise a plurality of heating elements that are connected in series. The heating elements 337, 338, 340 of the heating enclosure 327 can achieve a power output of from about 4 kilowatts (kW) to about 8 kW and can output a temperature that is less than or equal to 2000° C. In some embodiments, the heating elements 337, 338, 340 of the heating enclosure 327 may be substantially identical, with each heating element (e.g., 337, 338, or 340) capable of producing the power output of from about 1 kW to about 2 kW. The heating elements 337, 338, 340 of the heating enclosure 327 are not limited to operating in series, and in some embodiments, the heating elements 337, 338, 340 of the heating enclosure 327 can be operated independently of one another. For example, one or more of the heating elements can be turned on and maintained at a first temperature, while one or more other heating elements can either be turned off or maintained at a second temperature that is different than the first temperature. As such, the heating enclosure 327 can generate a temperature gradient within the molten material 121 that flows through the conduit 139. In some embodiments, altering a temperature along one side of the molten material 121 may be desirable, for example, to accommodate for a non-uniform radial temperature distribution of the molten material 121.

Figure 6:
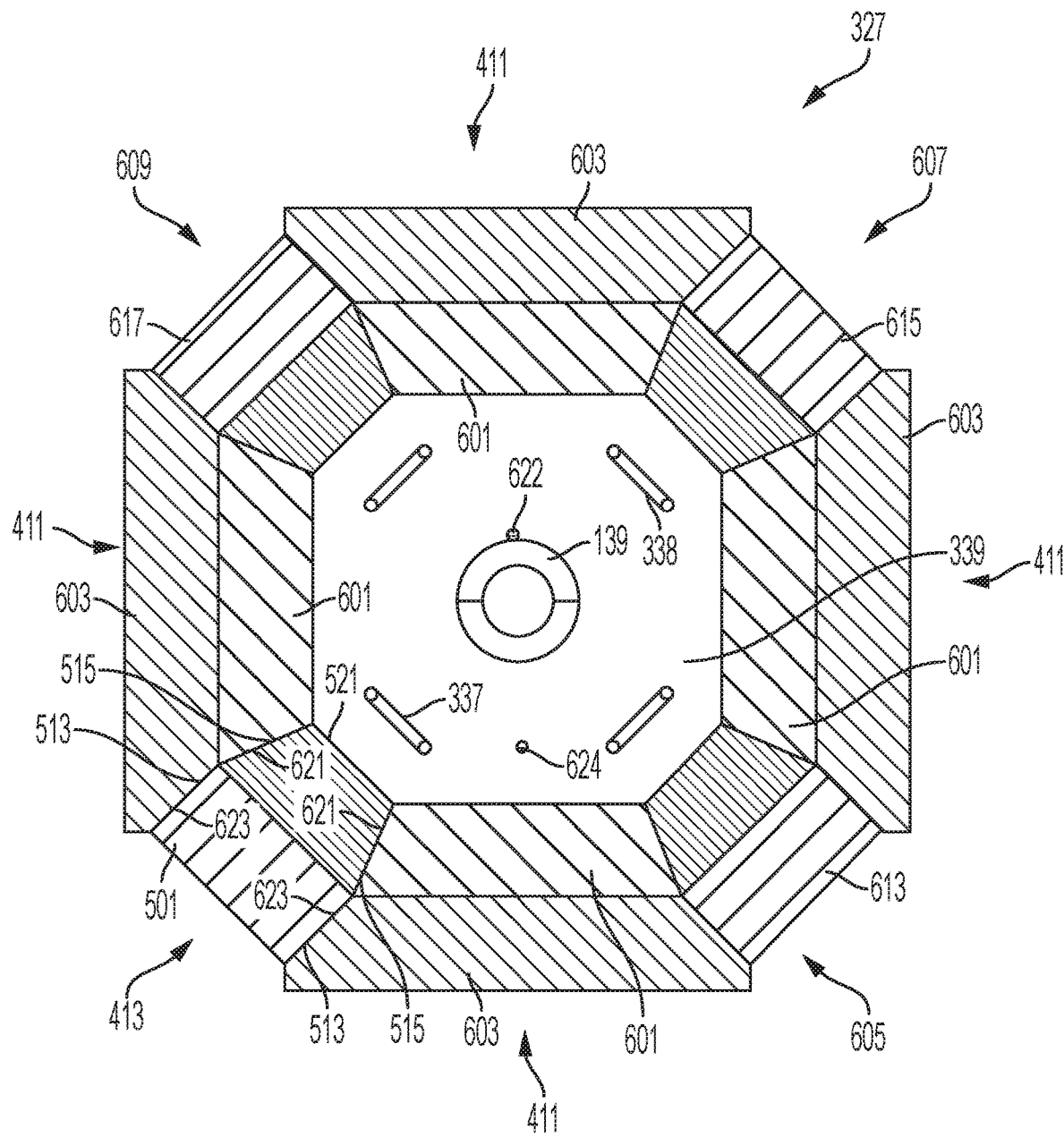
FIG. 6 illustrates a cross-sectional view of the heating enclosure along line 6-6 of FIG. 4 in accordance with embodiments of the disclosure.
Figure 7:
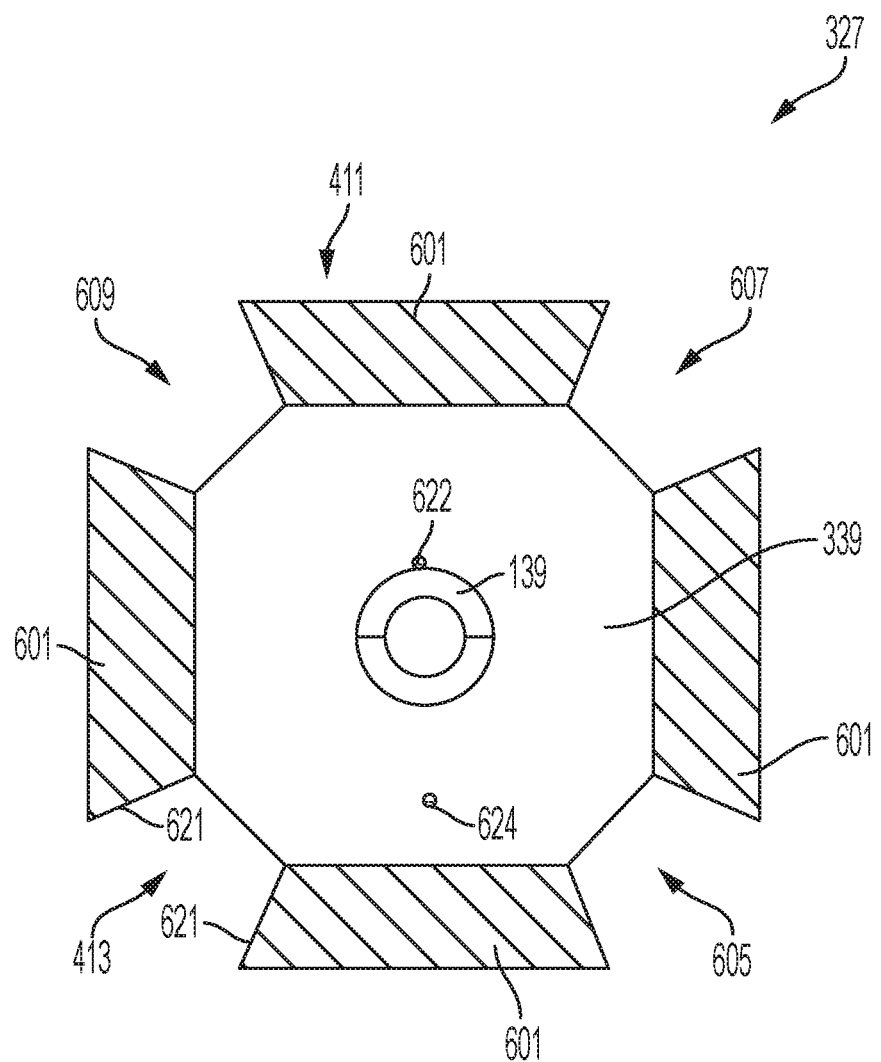
FIG. 7 illustrates a cross-sectional view of the heating enclosure similar to FIG. 6 but with portions of the heating enclosure removed in accordance with embodiments of the disclosure.

Referring to FIG. 6, a cross-sectional view of the heating enclosure 327 along line 6-6 of FIG. 4 is illustrated. In some embodiments, the perimeter wall 411 can comprise one or more walls, for example, an inner perimeter wall 601 and an outer perimeter wall 603. The inner perimeter wall 601 can define a boundary of the chamber 339 and may be positioned in closer proximity to the conduit 139 than the outer perimeter wall 603. The inner perimeter wall 601 may comprise a front face that faces the chamber 339 and a rear face, located opposite the front face, that faces the outer perimeter wall 603. The outer perimeter wall 603 can be positioned adjacent to the rear face of the inner perimeter wall 601 and may be in contact with the inner perimeter wall 601. In some embodiments, the outer perimeter wall 603 may be removable from the heating enclosure 327 (e.g., as illustrated in FIG. 7) to reduce the thickness of the thermally insulating material that surrounds the chamber 339. For example, the inner perimeter wall 601 and the outer perimeter wall 603 may comprise a thermally insulating material (e.g., a ceramic material). By removing the outer perimeter wall 603 from the heating enclosure 327, the thickness of the perimeter wall 411 (e.g., and the thickness of the thermal insulation surrounding the chamber 339) is reduced, thus allowing for more heat to escape from the chamber 339 through the perimeter wall 411. In some embodiments, the top wall 401 (e.g., illustrated in FIG. 4) can be supported by the inner perimeter wall 601, with the top wall 401 resting upon the inner perimeter wall 601. As such, in some embodiments, the outer perimeter wall 603 can be removed while the top wall 401 can remain supported by the inner perimeter wall 601.

The inner perimeter wall 601 and the outer perimeter wall 603 can comprise the opening 413 into which the first heating apparatus 501 may be received. The perimeter wall 411 is not limited to a single opening, and in some embodiments, the perimeter wall 411 can comprise a plurality of openings, for example, a second opening 605, a third opening 607, and a fourth opening 609. The second opening 605, the third opening 607, and/or the fourth opening 609 may be similar in shape and dimension to the opening 413. In some embodiments, the heating enclosure 327 comprises a quadrilateral shape, with the openings (e.g., the opening 413, the second opening 605, the third opening 607, and the fourth opening 609) located at the corners and the perimeter wall 411 forming the sides.

In some embodiments, one or more of the openings 413, 605, 607, 609 may be sized and shaped to receive a heating apparatus (e.g., the heating apparatuses received within the openings 413, 605, 607, 609 in FIG. 6) while also allowing for the heating apparatuses to be removed from the openings 413, 605, 607, 609 (e.g., the heating apparatuses removed from the openings 413, 605, 607, 609 in FIG. 7). For example, the heating enclosure 327 may comprise a plurality of heating apparatuses, such as the first heating apparatus 501, a second heating apparatus 613, a third heating apparatus 615, and a fourth heating apparatus 617. In some embodiments, the heating apparatuses 501, 613, 615, 617 can be removably received within the openings 413, 605, 607, 609. For example, the first heating apparatus 501 can be removably received within the opening 413 of the perimeter wall 411. In some embodiments, the second heating apparatus 613 can be removably received within the second opening 605. In some embodiments, the third heating apparatus 615 can be removably received within the third opening 607. In some embodiments, the fourth heating apparatus 617 can be removably received within the fourth opening 609. By being removably received, the heating apparatuses 501, 613, 615, 617 can be removed from the heating enclosure 327 without destruction or damage to the heating enclosure 327. For example, one or more of the heating apparatuses 501, 613, 615, 617 can be removed from the heating enclosure 327 and later re-inserted into (e.g., by being slidably received within the opening 413) the heating enclosure 327.

In some embodiments, the inner perimeter wall 601 and the outer perimeter wall 603 may comprise angled faces that border the openings 413, 605, 607, 609 and match an orientation of the first side face 513 and the second side face 515 of the first heating apparatus 501. For example, the inner perimeter wall 601 may comprise an inner side face 621, and the outer perimeter wall 603 may comprise an outer side face 623 that border the opening 413. In some embodiments, an angle defined between the inner side face 621 and the outer side face 623 may be substantially similar to an angle defined between the first side face 513 and the second side face 515 of the first heating apparatus 501. In some embodiments, a distance separating the inner side faces 621 on opposing sides of the opening 413 can decrease in a direction from an exterior of the heating enclosure 327 towards the conduit 139. A distance separating the outer side faces 623 on opposing sides of the opening 413 can be constant in the direction from the exterior of the heating enclosure 327 towards the conduit 139. In this way, the first heating apparatus 501 can be received within the opening 413, with the first side faces 513 engaging (e.g., contacting, abutting, etc.) the inner side faces 621 of the inner perimeter wall 601, and the second side faces 515 engaging the outer side faces 623 of the outer perimeter wall 603. The first heating apparatus 501 can therefore be maintained within the opening 413 at a fixed distance from the conduit 139, with the first heating apparatus 501 limited from inadvertent movement relative to the perimeter wall 411. For example, the opening 413 is tapered due to the inner side faces 621 converging towards one another in a direction towards the chamber 339. Likewise, the first heating apparatus 501 may also be tapered due to the second side faces 515 converging towards the front face 521. As such, the engagement of the second side faces 515 and the inner side faces 621 can limit the first heating apparatus 501 from being over-inserted into the opening 413 and from extending too far into the chamber 339. In this way, a minimum distance between the first heating apparatus 501 and the conduit 139 can be maintained.

While the foregoing discussion of a heating apparatus being received within an opening was made relative to the first heating apparatus 501 and the opening 413, it will be appreciated that the other heating apparatuses 613, 615, 617 can be received in the other openings 605, 607, 609 in a similar manner. For example, the second heating apparatus 613, the third heating apparatus 615, and the fourth heating apparatus 617 may be substantially similar in size, shape, and function to the first heating apparatus 501. The second heating apparatus 613, the third heating apparatus 615, and the fourth heating apparatus 617 can comprise a heating wall (e.g., similar to the heating wall 335), a heating element (e.g., similar to the first heating element 337), etc. Likewise, in some embodiments, the second opening 605, the third opening 607, and the fourth opening 609 may be similar in size, shape, and function to the opening 413. As such, in some embodiments, the second heating apparatus 613 can be received within the second opening 605 in a similar manner as the first heating apparatus 501 is received within the opening 413. Likewise, in some embodiments, the third heating apparatus 615 can be received within the third opening 607 in a similar manner as the first heating apparatus 501 is received within the opening 413. In some embodiments, the fourth heating apparatus 617 can be received within the fourth opening 609 in a similar manner as the first heating apparatus 501 is received within the opening 413.

In some embodiments, the glass manufacturing apparatus 100 can comprise one or more temperature sensors positioned within the chamber 339 that can detect a temperature. For example, the one or more temperature sensors can comprise a first temperature sensor 622 and a second temperature sensor 624. The first temperature sensor 622 can be positioned in proximity to the conduit 139. In some embodiments, by being positioned in proximity to the conduit 139, the first temperature sensor 622 can be attached to the conduit 139, while in other embodiments, the first temperature sensor 622 can be attached to a wall of the heating enclosure 327, such as to the top wall 401 or the bottom wall 403, adjacent to the conduit 139. By positioning the first temperature sensor 622 in proximity to the conduit 139, the first temperature sensor 622 can detect a temperature of the conduit 139 that may be indicative of a temperature of the molten material 121 that flows within the channel 303 of the conduit 139. In some embodiments, the second temperature sensor 624 can be adjacent to the first heating element 337, such as by being positioned between the first heating element 337 and an adjacent heating element. For example, the second temperature sensor 624 can be attached to a wall of the heating enclosure 327, such as to the top wall 401 or the bottom wall 403 near the first heating element 337. As such, the second temperature sensor 624 can detect a temperature within the chamber 339 near the first heating element 337 to ensure that the first heating element 337 is supplying a desired amount of heat to the chamber 339.

While the heating enclosure 327 can heat the molten material 121 flowing through the conduit 139, in some embodiments, there may be a desire to cool the molten material 121. For example, in some embodiments, the first temperature sensor 622 and/or the second temperature sensor 624 may detect that the temperature within the chamber 339 is too high. To reduce the temperature within the chamber 339, the heating enclosure 327 can be adapted in one or more ways. For example, in some embodiments, one or more of the first heating apparatus 501, the second heating apparatus 613, the third heating apparatus 615, or the fourth heating apparatus 617 can be turned off. In some embodiments, the first heating apparatus 501 may remain on while one or more of the second heating apparatus 613, the third heating apparatus 615, or the fourth heating apparatus 617 can be turned off. By turning off one or more of the heating apparatuses 501, 613, 615, 617, the temperature within the chamber 339 can be reduced. In some embodiments, the chamber 339 can be cooled without turning off the heating apparatuses 501, 613, 615, 617. For example, the power supplied to one or more of the heating apparatuses 501, 613, 615, 617 can be reduced such that the amount of heat generated by the heating apparatuses 501, 613, 615, 617 can likewise be reduced, thus decreasing a temperature within the chamber 339. In some embodiments, however, there may be a desire for a more rapid temperature reduction within the chamber 339 than can be achieved by turning off or reducing the power of one or more of the heating apparatuses 501, 613, 615, 617.

Referring to FIG. 7, in some embodiments, to achieve a faster cooling of the chamber 339, and, thus, of the molten material 121 within the conduit 139, one or more portions of the heating enclosure 327 can be removed. For example, in some embodiments, one or more of the heating apparatuses 501, 613, 615, 617 can be removed from the heating enclosure 327. By removing one or more of the heating apparatuses 501, 613, 615, 617, the chamber 339 may be exposed to an exterior of the heating enclosure 327 through one or more of the openings 413, 605, 607, 609. In some embodiments, a temperature at the exterior of the heating enclosure 327 is less than the temperature within the chamber 339. As such, by removing the heating apparatuses 501, 613, 615, 617, the temperature within the chamber 339 can be cooled due to airflow through the openings 413, 605, 607, 609 and heat loss from the chamber 339 to an exterior of the heating enclosure 327. In addition or in the alternative, removal of the heating apparatuses 501, 613, 615, 617 can facilitate maintenance of the heating enclosure 327. For example, during operation, it may be desirable to perform maintenance or repair on one or more of the heating apparatuses 501, 613, 615, 617. Rather than removing and replacing the entire heating enclosure 327, in some embodiments, one or more of the heating apparatuses 501, 613, 615, 617 can be removed from the heating enclosure 327 and either repaired or replaced. As such, replacement of the entire heating enclosure 327 in the event of one of the heating apparatuses 501, 613, 615, 617 not working properly may be avoided, thus reducing costs and downtime.

To further facilitate cooling of the chamber 339, a portion of the perimeter wall 411 can be removed. For example, the outer perimeter wall 603, which may comprise a thermally insulating material, can be detached and/or removed from the inner perimeter wall 601. By removing the outer perimeter wall 603, the chamber 339 may be surrounded by the inner perimeter wall 601, thus reducing a thickness of the perimeter wall 411. In this way, due to the heating enclosure 327 comprising a reduced amount of thermally insulating material (e.g., the outer perimeter wall 603), the chamber 339 can be cooled due to heat loss through the inner perimeter wall 601. While the heating enclosure 327 of FIG. 7 is illustrated without any of the outer perimeter wall 603, in some embodiments, some, but not all, of the outer perimeter wall 603 may be removed. For example, one or more portions of the inner perimeter wall 601 may not be backed by the outer perimeter wall 603, while other portions of the inner perimeter wall 601 may be backed by the outer perimeter wall 603. In this way, more rapid heat loss may be achieved at locations where the outer perimeter wall 603 has been removed, while slower heat loss may be achieved at locations where the outer perimeter wall 603 remains behind the inner perimeter wall 601. In some embodiments, to achieve maximum cooling of the chamber 339, all of the heating apparatuses 501, 613, 615, 617 can be removed along with all of the outer perimeter wall 603. As such, heat can be dissipated from the chamber 339 both through the openings 413, 605, 607, 609 and through the inner perimeter wall 601.

Figure 8:
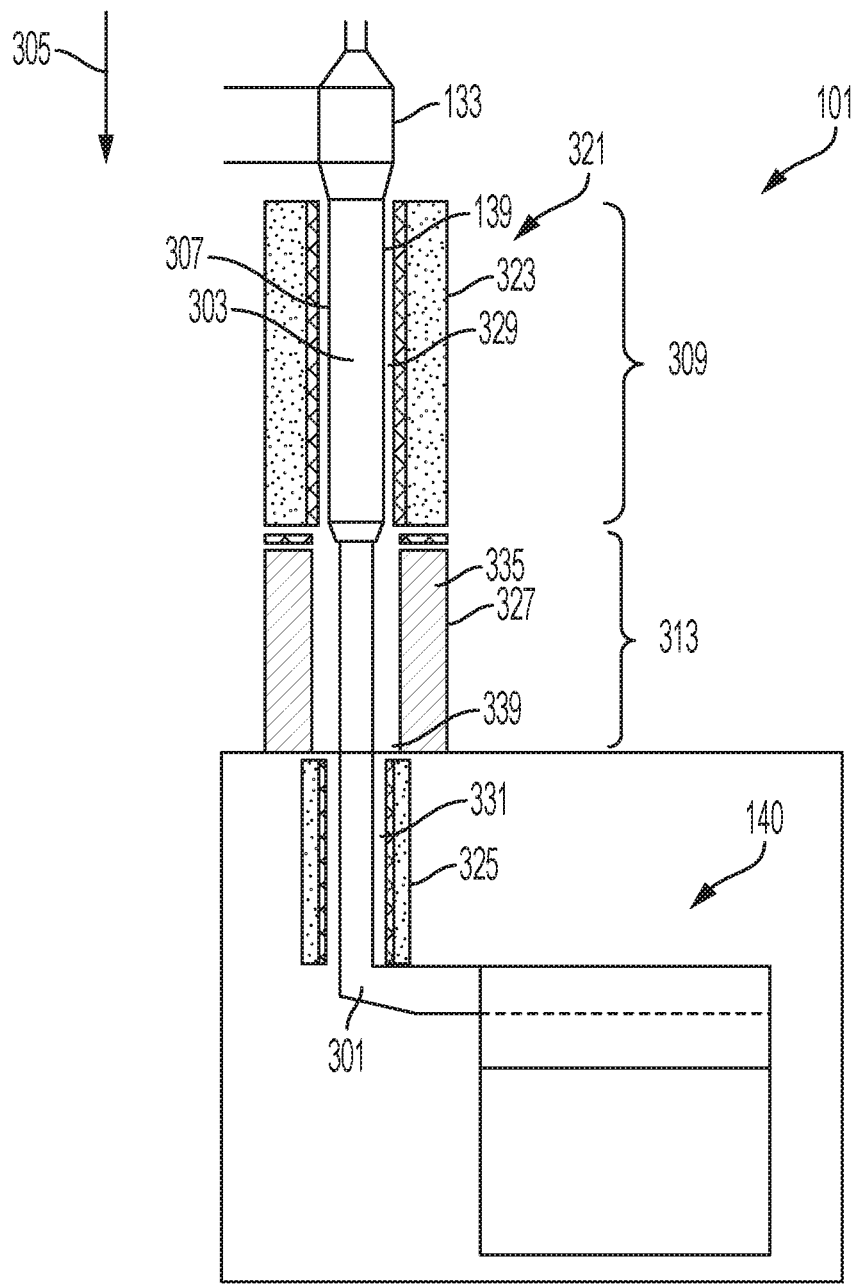
FIG. 8 illustrates an enlarged view of a portion of the glass manufacturing apparatus similar to FIG. 3 but with portions of the heating enclosure removed in accordance with embodiments of the disclosure.

Referring to FIG. 8, a schematic side view of the glass manufacturing apparatus 100 is illustrated in which one or more of the heating apparatuses 501, 613, 615, 617, and, thus, the heating elements 337, 338, 340 have been removed. In some embodiments, methods of manufacturing the glass ribbon 103 with the glass manufacturing apparatus 100 can comprise flowing the molten material 121 within the channel 303 of the conduit 139 in the flow direction 305 of the conduit 139. For example, the molten material 121 can flow from the delivery vessel 133 to the conduit 139. The conduit 139 may be substantially hollow to define the channel 303. The molten material 121 can therefore flow through the channel 303 of the conduit 139 to the inlet 301 of the forming vessel 140. In some embodiments, the flowing the molten material 121 can comprise flowing the molten material 121 in a direction of gravity. For example, the conduit 139 may be oriented vertically between the delivery vessel 133 and the inlet 301 of the forming vessel 140. With the conduit 139 oriented vertically, the molten material 121 may flow downwardly in a direction of gravity towards the inlet 301 of the forming vessel 140.

In some embodiments, methods of manufacturing the glass ribbon 103 with the glass manufacturing apparatus 100 can comprise heating the molten material 121 flowing within the channel 303 with the first heater 323 that is upstream from the heating enclosure 327 relative to the flow direction 305 and with the second heater 325 that is downstream from the heating enclosure 327 relative to the flow direction 305. For example, when the molten material 121 flows through the conduit 139, the molten material 121 may first be heated by the first heater 323, which is located immediately downstream from the delivery vessel 133. The molten material 121 may then be heated by the heating enclosure 327 before being heated by the second heater 325. In some embodiments, the first portion 309 of the conduit 139 may be heated by the first heater 323 while the second portion 313 of the conduit 139 may be heated by the second heater 325.

In some embodiments, methods of manufacturing the glass ribbon 103 with the glass manufacturing apparatus 100 can comprise heating the molten material flowing within the channel 303 with the heating enclosure 327 that surrounds the conduit 139. For example, referring to FIG. 3, the heating enclosure 327 may comprise the first heating element 337 surrounded by one or more walls, such as the heating wall 335, the perimeter wall 411, etc. The heating enclosure 327 can comprise the chamber 339 within which the conduit 139 extends. The first heating element 337 can extend within the chamber 339, between the conduit 139 and the walls (e.g., the heating wall 335, the perimeter wall 411, etc.) of the heating enclosure 327. When the first heating element 337 is turned on, the first heating element 337 can generate heat, which can increase a temperature within the chamber 339. In some embodiments, the increased temperature within the chamber 339 can heat the molten material 121 that flows within the channel 303 of the conduit 139.

In some embodiments, the heating the molten material 121 flowing within the channel 303 with the heating enclosure 327 can comprise maintaining the first heating element 337 of the heating enclosure 327 at a different temperature than the second heating element 338 of the heating enclosure 327. For example, the first heating element 337 and the second heating element 338 can be maintained at different temperatures to alter one or more characteristics of the molten material 121 flowing through the conduit 139. For example, by maintain the first heating element 337 and the second heating element 338 at different temperatures, a flow rate of the molten material 121 along one side of the conduit 139 can be changed as compared to a flow rate of the molten material 121 along another side of the conduit 139. As such, maintaining heating elements 337, 338, 340 of the heating enclosure 327 at different temperatures can induce a temperature gradient within the molten material 121 and, thus, may compensate for some downstream effects on the molten material 121 by the forming vessel 140. For example, due to potential effects of deformation of the forming vessel 140 over time, it may be desirable to induce a radial temperature gradient within the molten material 121. In some embodiments, one side of the heating enclosure 327 can be operated at a higher power than an opposing side of the heating enclosure 327. In this way, a temperature gradient can be generated within the molten material 121, with the temperature gradient being maintained within the molten material 121 up to the point that the molten material 121 reaches the forming vessel 140. Due to this temperature gradient, flow of the molten material 121 from the forming vessel 140 can be altered.

Referring to FIGS. 7-8, in some embodiments, methods of manufacturing the glass ribbon 103 with the glass manufacturing apparatus 100 can comprise removing a portion of the heating enclosure 327 to cool the molten material 121 flowing within the channel 303. For example, there may be a desire to cool the molten material 121 flowing through the conduit 139 with the heating enclosure 327. This cooling can be accomplished in several ways. In some embodiments, the heating elements 337, 338, 340 can be turned off, such that the heating enclosure 327 may not provide heat within the chamber 339. In some embodiments, to achieve additional cooling, one or more portions of the heating enclosure 327 can be removed to provide for airflow between the chamber 339 of the heating enclosure 327 and an exterior of the heating enclosure 327. For example, the removing the portion of the heating enclosure 327 can comprise removing one or more of the first heating element 337 or the second heating element 338 from the heating enclosure 327. In some embodiments, the first heating element 337 can be removed by removing the first heating apparatus 501 from the opening 413. The removal of the first heating apparatus 501 (e.g., and, thus, the first heating element 337) can provide for a path through the opening 413 through which the heat within the chamber 339 can be dissipated. In addition or in the alternative, in some embodiments, the second heating element 338 can be removed by removing the third heating apparatus 615 from the third opening 607. The removal of the third heating apparatus 615 (e.g., and, thus, the second heating element 338 of the third heating apparatus 615) can provide for a path through the third opening 607 through which the heat within the chamber 339 can be dissipated. In some embodiments, to provide additional cooling of the molten material 121, all four of the heating apparatuses 501, 613, 615, 617 can be removed from the heating enclosure 327, in addition to the outer perimeter walls 603 of the heating enclosure 327.

Figure 9:
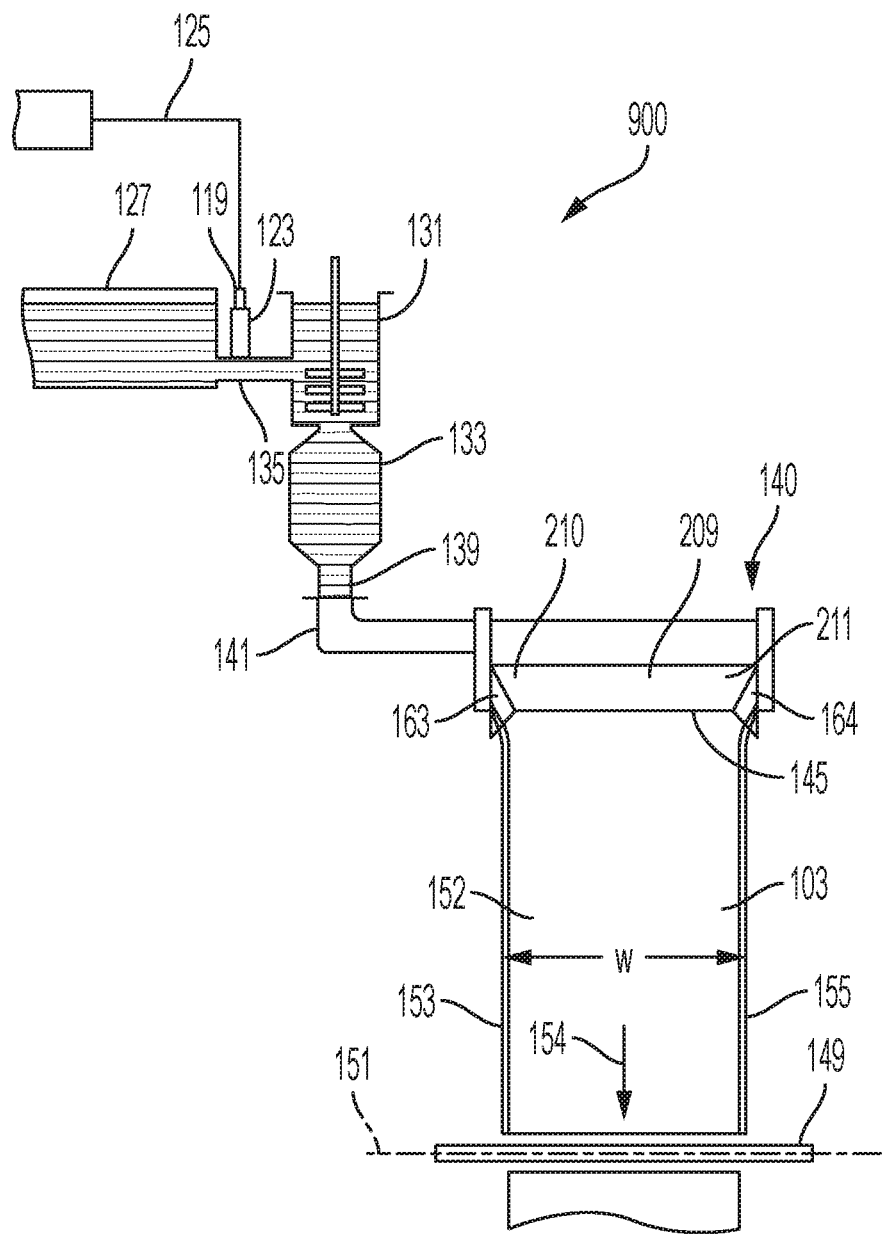
FIG. 9 schematically illustrates a glass manufacturing apparatus in accordance with embodiments of the disclosure.

Referring to FIG. 9, additional embodiments of a glass manufacturing apparatus 900 are illustrated. In some embodiments, the delivery vessel 133 can be positioned beneath the mixing chamber 131, such that the third connecting conduit 137 may or may not be provided. In some embodiments, the molten material 121 can flow from the mixing chamber 131 to the delivery vessel 133 due to the force of gravity. For example, the molten material 121 can flow downwardly from the mixing chamber 131 to the delivery vessel 133, whereupon the molten material 121 can flow into and through the conduit 139. In some embodiments, the conduit 139 can extend along an axis (e.g., with the axis being coaxial with the conduit 139), and the axis can intersect the delivery vessel 133 and the mixing chamber 131. In this way, the delivery vessel 133 is not limited to being positioned to a lateral side of the mixing chamber 131. Rather, in some embodiments, the delivery vessel 133 can be positioned below the mixing chamber 131, with a bottom of the mixing chamber 131 and a top of the delivery vessel 133 being connected and in fluid communication.

In some embodiments, the glass manufacturing apparatus 100 can provide several benefits associated with heating and/or cooling of the molten material 121 that flows through the conduit 139. For example, the conduit 139 can comprise the closed sidewall 307 that is free of openings. As such, air, contaminants, etc. can be limited from passing through the closed sidewall 307 and entering the channel 303. As such, consequences of exposing the molten material 121 to air or contaminants, for example, the formation of condensation within the channel 303, hydrogen permeation of the molten material 121, etc., may be reduced. In addition, the heating enclosure 327 can provide for varying levels of heating and cooling the molten material 121. For example, portions of the heating enclosure 327 can be removed, such as one or more of the heating apparatuses 501, 613, 615, 617, some or all of the outer perimeter walls 603, etc. As such, cooling of the chamber 339 can be achieved quickly by removing portions of the heating enclosure 327, such as the one or more of the heating apparatuses 501, 613, 615, 617, some or all of the outer perimeter walls 603, etc. Likewise, a temperature gradient within the chamber 339 can be achieved, for example, by turning on some of the heating apparatuses 501, 613, 615, 617 but not others, and/or by removing some portions of the outer perimeter wall 603. As such, heat loss from the chamber 339 can be accelerated along certain sides of the heating enclosure 327, while minimized along other sides of the heating enclosure 327. In addition, the channel 303 of the conduit 139 comprises a non-constant cross-sectional size that is orthogonal to the flow direction 305 between the delivery vessel 133 and the inlet 301 of the forming vessel 140. Due to the reduced size of the channel 303 in proximity to the heating enclosure 327, flow resistance of the molten material 121 surrounded by the heating enclosure 327 is increased. In this way, the effects of the heating apparatuses 501, 613, 615, 617 on the molten material 121 can be increased due to the increased time that the molten material 121 spends in the channel 303 passing through the heating enclosure 327. For example, at a constant flow volume, a flow velocity of the molten material 121 may increase, which decreases the amount of time that the molten material 121 spends within the portion of the conduit 139 that is surrounded by the heating enclosure 327. To accommodate for this reduced time that the molten material 121 is exposed to the effects of the heating enclosure 327, the heating enclosure 327 can be operated at a higher temperature than the first heater 323 and the second heater 325, thus providing greater heating to the molten material 121. In the alternative, portions of the heating enclosure 327 can be removed, thus providing greater cooling of the molten material 121 than with the first heater 323 or the second heater 325.

Accordingly, the following nonlimiting embodiments are exemplary of the present disclosure.

Embodiment 1. A glass manufacturing apparatus can comprise a conduit connected to a delivery vessel and an inlet of a forming vessel. The conduit can comprise a closed sidewall surrounding a channel extending in a flow direction of the conduit. The closed sidewall can be continuous from the delivery vessel to the inlet of the forming vessel to define a closed atmosphere from the delivery vessel, through the conduit, and through the inlet of the forming vessel. The glass manufacturing apparatus can comprise a heating enclosure comprising a heating wall and a first heating element. The heating wall can surround a chamber within which the conduit extends. The first heating element can be positioned within the chamber between the heating wall and the conduit to increase a temperature within the channel.

Embodiment 2. The glass manufacturing apparatus of embodiment 1, wherein the flow direction is in a direction of gravity.

Embodiment 3. The glass manufacturing apparatus of any one of embodiments 1-2, wherein the heating wall comprises a thermally insulating material.

Embodiment 4. The glass manufacturing apparatus of any one of embodiments 1-3, wherein the heating enclosure comprises a perimeter wall surrounding the chamber, the perimeter wall comprising an opening.

Embodiment 5. The glass manufacturing apparatus of embodiment 4, wherein the heating enclosure comprises a first heating apparatus comprising the heating wall and the first heating element, the first heating apparatus removably received within the opening of the perimeter wall.

Embodiment 6. The glass manufacturing apparatus of embodiment 5, wherein the heating enclosure comprises a plurality of heating apparatuses.

Embodiment 7. The glass manufacturing apparatus of any one of embodiments 1-6, wherein the channel comprises a non-constant cross-sectional size that is orthogonal to the flow direction between the delivery vessel and the inlet of the forming vessel.

Embodiment 8. The glass manufacturing apparatus of any one of embodiments 1-7, wherein the first heating element is spaced a distance apart from the heating wall and the conduit.

Embodiment 9. The glass manufacturing apparatus of any one of embodiments 1-8, further comprising one or more temperature sensors positioned within the chamber.

Embodiment 10. A glass manufacturing apparatus can comprise a conduit positioned between a delivery vessel and an inlet of a forming vessel. The conduit can comprise a channel extending in a flow direction of the conduit. The conduit can comprise a first portion, in which the channel comprises a first cross-sectional size, and a second portion, downstream from the first portion relative to the flow direction, in which the channel comprises a second cross-sectional size that is less than the first cross-sectional size. The glass manufacturing apparatus can comprise a heating enclosure comprising a heating wall and a first heating element. The heating wall surrounds a chamber within which the second portion of the conduit extends. The first heating element can be positioned within the chamber between the heating wall and the second portion of the conduit to increase a temperature within the channel.

Embodiment 11. The glass manufacturing apparatus of embodiment 10, wherein the flow direction is in a direction of gravity.

Embodiment 12. The glass manufacturing apparatus of any one of embodiments 10-11, wherein the heating wall comprises a thermally insulating material.

Embodiment 13. The glass manufacturing apparatus of any one of embodiments 10-12, wherein the heating enclosure comprises a perimeter wall surrounding the chamber, the perimeter wall comprising an opening.

Embodiment 14. The glass manufacturing apparatus of embodiment 13, wherein the heating wall and the first heating element comprise a first heating apparatus, the first heating apparatus removably received within the opening of the perimeter wall.

Embodiment 15. The glass manufacturing apparatus of any one of embodiments 10-14, further comprising one or more temperature sensors positioned within the chamber.

Embodiment 16. A method of manufacturing a glass ribbon with a glass manufacturing apparatus can comprise flowing molten material within a channel of a conduit in a flow direction of the conduit. The method can comprise heating the molten material flowing within the channel with a heating enclosure that surrounds the conduit. The method can comprise removing a portion of the heating enclosure to cool the molten material flowing within the channel.

Embodiment 17. The method of embodiment 16, wherein the flowing the molten material comprises flowing the molten material in a direction of gravity.

Embodiment 18. The method of any one of embodiments 16-17, wherein the heating the molten material with the heating enclosure comprises maintaining a first heating element of the heating enclosure at a different temperature than a second heating element of the heating enclosure.

Embodiment 19. The method of embodiment 18, wherein the removing the portion of the heating enclosure comprises removing one or more of the first heating element or the second heating element from the heating enclosure.

Embodiment 20. The method of any one of embodiments 16-19, further comprising heating the molten material flowing within the channel with a first heater that is upstream from the heating enclosure relative to the flow direction and with a second heater that is downstream from the heating enclosure relative to the flow direction.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example within about 5% of each other, or within about 2% of each other.

As used herein, the terms "comprising" and "including," and variations thereof shall be construed as synonymous and open-ended, unless otherwise indicated.

It should be understood that while various embodiments have been described in detail relative to certain illustrative and specific embodiments thereof, the present disclosure should not be considered limited to such, as numerous modifications and combinations of the disclosed features are possible without departing from the scope of the following claims.

What is claimed is:

1. A glass manufacturing apparatus comprising:
   a conduit connected to a delivery vessel and an inlet of a forming vessel, the conduit comprising a closed sidewall surrounding a channel extending in a flow direction of the conduit, the closed sidewall continuous from the delivery vessel to the inlet of the forming vessel to define a closed atmosphere from the delivery vessel, through the conduit, and through the inlet of the forming vessel; and
   a heating enclosure comprising a first heating element and a plurality of walls surrounding a chamber within which the conduit extends, the first heating element positioned within the chamber between a heating wall of the plurality of walls and the conduit to increase a temperature within the channel, the heating wall and the first heating element configured to be removable to expose the chamber to an exterior of the heating enclosure.

2. The glass manufacturing apparatus of claim 1, wherein the flow direction is in a direction of gravity.

3. The glass manufacturing apparatus of claim 1, wherein the heating wall comprises a thermally insulating material, and wherein the heating enclosure comprises a top wall and a bottom wall spaced apart from the top wall with the chamber between the top wall and the bottom wall, the top wall positioned adjacent to a bottom surface of a first heater and the bottom wall positioned adjacent to a top surface of a second heater.

4. The glass manufacturing apparatus of claim 1, wherein the heating enclosure comprises a perimeter wall surrounding the chamber, the perimeter wall comprising an opening.

5. The glass manufacturing apparatus of claim 4, wherein the heating enclosure comprises a plurality of heating elements positioned within the chamber, and wherein the plurality of heating elements are operable independently of one another.

6. The glass manufacturing apparatus of claim 1, wherein the channel comprises a non-constant cross-sectional size that is orthogonal to the flow direction between the delivery vessel and the inlet of the forming vessel.

7. The glass manufacturing apparatus of claim 1, wherein the first heating element is spaced a distance apart from the heating wall and the conduit, and wherein the first heating element comprises a U-shaped portion that extends substantially parallel to an axis along which the conduit extends.

8. The glass manufacturing apparatus of claim 1, further comprising one or more temperature sensors positioned within the chamber.

9. A glass manufacturing apparatus comprising:
   a conduit positioned between a delivery vessel and an inlet of a forming vessel, the conduit comprising a channel extending in a flow direction of the conduit, the conduit comprising a first portion, in which the channel comprises a first cross-sectional size, and a second portion, downstream from the first portion relative to the flow direction, in which the channel comprises a second cross-sectional size that is less than the first cross-sectional size; and
   a heating enclosure comprising a heating wall and a first heating element, the heating wall surrounding a chamber within which the second portion of the conduit extends, the first heating element positioned within the chamber between the heating wall and the second portion of the conduit to increase a temperature within the channel, wherein the heating enclosure comprises a perimeter wall surrounding the chamber, the perimeter wall comprising an opening, and wherein the heating wall and the first heating element comprise a first heating apparatus removably received within the opening of the perimeter wall.

10. The glass manufacturing apparatus of claim 9, wherein the flow direction is in a direction of gravity.

11. The glass manufacturing apparatus of claim 9, wherein the heating wall comprises a thermally insulating material.

12. The glass manufacturing apparatus of claim 9, further comprising one or more temperature sensors positioned within the chamber.

13. A glass manufacturing apparatus comprising:
- a conduit connected to a delivery vessel and an inlet of a forming vessel, the conduit comprising a closed sidewall surrounding a channel extending in a flow direction of the conduit, the closed sidewall continuous from the delivery vessel to the inlet of the forming vessel to define a closed atmosphere from the delivery vessel, through the conduit, and through the inlet of the forming vessel; and
- a heating enclosure comprising a heating wall and a first heating element, the heating wall surrounding a chamber within which the conduit extends, the first heating element positioned within the chamber between the heating wall and the conduit to increase a temperature within the channel;
- wherein the heating enclosure comprises a perimeter wall surrounding the chamber, the perimeter wall comprising an opening, the heating enclosure comprising a first heating apparatus comprising the heating wall and the first heating element, the first heating apparatus removably received within the opening of the perimeter wall.

14. The glass manufacturing apparatus of claim 13, wherein the flow direction is in a direction of gravity.

15. The glass manufacturing apparatus of claim 13, wherein the heating wall comprises a thermally insulating material.

16. The glass manufacturing apparatus of claim 13, wherein the heating enclosure comprises a plurality of heating apparatuses.

* * * * *